(12) United States Patent
Kojima

(10) Patent No.: US 7,098,446 B2
(45) Date of Patent: Aug. 29, 2006

(54) PHOTOELECTRIC ENCODER

(75) Inventor: Kenji Kojima, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 175 days.

(21) Appl. No.: 10/844,439

(22) Filed: May 13, 2004

(65) Prior Publication Data

US 2005/0017158 A1  Jan. 27, 2005

(30) Foreign Application Priority Data

May 16, 2003 (JP) .............................. 2003-139062
Apr. 22, 2004 (JP) .............................. 2004-126994

(51) Int. Cl.
*G01D 5/34* (2006.01)
*G01B 11/14* (2006.01)

(52) U.S. Cl. ..................... 250/231.14; 250/231.16; 356/617

(58) Field of Classification Search ........... 250/231.13, 250/231.14, 231.16; 356/616, 617; 341/11, 341/13, 31
See application file for complete search history.

(56) References Cited

U.S. PATENT DOCUMENTS

| | | | |
|---|---|---|---|
| 4,650,993 A | 3/1987 | Boella et al. | |
| 4,778,273 A | 10/1988 | Michel | |
| 6,965,437 B1* | 11/2005 | Mayer et al. | 356/614 |
| 2001/0011699 A1* | 8/2001 | Aoki | 250/231.13 |

FOREIGN PATENT DOCUMENTS

| | | |
|---|---|---|
| GB | 2 352 811 A | 2/2001 |
| JP | A-60-239610 | 11/1985 |
| JP | A-61-091513 | 5/1986 |
| JP | A 7-151565 | 6/1995 |
| JP | A-11-201777 | 7/1999 |
| WO | WO 01/31292 A1 | 5/2001 |

* cited by examiner

*Primary Examiner*—Georgia Epps
*Assistant Examiner*—Don Williams
(74) *Attorney, Agent, or Firm*—Oliff & Berridge, PLC

(57) ABSTRACT

A photoelectric encoder includes an optical receipt chip on which a plurality of photodiodes (PDs) are laid out along a measurement axis "X" so that these are organized into an array. The layout pitch of PDs disposed at end portions of the array is made less than the pitch of those at a central portion of the array. Similarly the width of a light acceptance surface of the former is less than that of the latter.

14 Claims, 13 Drawing Sheets

PHOTOELECTRIC ENCODER

CROSS-REFERENCE TO RELATED APPLICATIONS

This application is based upon and claims the benefit of priority from the prior Japanese Patent Application Nos. 2003-139062, filed on May 16, 2003, and 2004-126994 filed on Apr. 22, 2004, the entire contents of which are incorporated herein by reference.

BACKGROUND OF THE INVENTION

1. Field of the Invention

The present invention relates to photoelectric encoders used for high-precision measurement.

2. Description of Related Art

In prior known applications, photoelectric encoders (referred to as "encoders" in some cases) are utilized for high-precision measurement of linear and angular displacement amounts. Encoders are equipped in three-dimensional (3D) measuring equipment, image measuring apparatus and others. An encoder is generally constituted from a light source, a scale including an optical grating, and a light-receiving unit which is disposed to be relatively movable together with the light source with respect the scale. The light-receiving unit, also known as photosensor module, includes four light-receiving elements (for example, photodiodes) and four index gratings which are laid out at locations corresponding to the light acceptance surfaces of respective light-receiving elements and which are different in phase from one another.

An operation of the encoder will be briefly explained below. While causing the light source and the light-receiving unit to relatively move together with respect to the scale, light from the light source is guided to progress through an optical system including the optical grating of the scale and then fall onto the four index gratings of the light-receiving unit. More specifically, while letting the index gratings of the light-receiving unit move relative to the optical grating of the scale, a pattern of interference fringes (light-and-shade pattern) that is created by irradiation of the light from the light source onto the optical grating of the scale is guided to bit the index gratings of the light-receiving unit. This results in production of four separate optical signals each having a sinusoidal or "sine" waveform indicative of a change in light intensity. These optical signals are different in phase from one another. The light signals are to be received and sensed by light-receiving elements corresponding to respective phases to thereby produce photoelectrically converted electrical signals, which are used for measurement of a position change amount, such as a linear displacement.

The four phase-different optical signals of interest are an optical signal with a phase "A" (zero degrees), an optical signal with a phase "B" (90 degrees) which is deviated or offset by 90 degrees from the phase A, an optical signal with a phase "AA" (180 degrees) that is offset by 180 degrees from the phase A, and an optical signal with a phase "BB" (270 degrees) as offset by 270 degrees from the phase A. Using the phase A and phase B is to determine or "judge" the direction of relative movement of the light-receiving unit in a way depending upon which one of the phases A and B is to be detected first. Additionally, the use of those light signals with the phases AA and BB—these are phase-inverted versions of the light signals with phases A and B, respectively—in addition to the light signals with phases A and B is aimed at (1) removal of DC components contained in the light signals with phases A and B, (2) achievement of the reliability of light signals, and (3) establishment of high-speed tracking capabilities.

Principally, measurement is achievable as far as there are light-receiving elements which correspond in number to a plurality of phase-different optical signals. Accordingly, in the case of four phase-different light signals, what is required is to use four light-receiving elements. An encoder of the first type is disclosed, for example, in the pamphlet of International Publication No. 01/31292 (see the specification, page 5, line 19 to page 6, line 7, along with FIG. 5).

Incidentally, deviation or fluctuation sometimes takes place in light amount due to the light source's optical intensity distribution and/or dirt on the surface of a scale. According to the above-noted type of encoder, this is easily affectable by such light amount irregularity because an optical signal with each phase is sensed at a single location. For example, suppose that the layout position of a light-receiving element used for the phase A is weaker in intensity of irradiation light than the layout position of another light-receiving element. If this is the case, an output of the phase A becomes weaker, resulting in a likewise decrease in measurement accuracy.

A known approach to avoiding this is to employ a second type of encoder, which has an array of fine-divided light-receiving elements. More specifically these fine-divided light-receiving elements are placed to have an array-like layout to thereby make them function also as index gratings. Furthermore, the light-receiving elements are disposed along the encoder's measurement axis direction while being organized into a plurality of sets, each of which consists of four light-receiving elements used for the phases A, B, AA and BB. This type is disclosed, for example, in Published Japanese Patent Application No. 7-151565 (JP-A-7-151565), Paragraph "[0014]" and FIG. 4. With this approach, the location whereat an optical signal with each phase is sensed is dispersed to cover a wide range. Thus it is possible to lessen the influenceability of light-amount irregularity. This will be referred to as the "averaging effect" hereinafter.

Light-receiving elements equipped in the second type of encoder are arranged at equal intervals or "pitches" in the measurement axis direction. In contrast, a third type of photoelectric encoder as disclosed, for example, in Published Patent Application No. 2004-501356 (FIG. 4) has light-receiving elements, which are laid out at equal pitches both in the measurement axis direction and in a direction at right angles thereto.

BRIEF SUMMARY OF THE INVENTION

Enhancing the averaging effect is important to improve the measurement accuracy. Unfortunately, mere enhancement of the averaging effect would result in a decrease in response speed of the encoder. This will be explained in detail below.

Light-receiving elements such as photodiodes are typically structured to have a p-n junction with an n-type semiconductor layer being in contact with a p-type semiconductor layer. If the capacitance of this junction becomes larger, then the encoder decreases in response speed. Thus, an increase in junction capacitance affects the performance of encoder. The junction capacitance of a light-receiving element is in correlation with the area of a light acceptance surface and/or the length of circumference (edges) of the light acceptance surface. In short, an increase in area or circumferential length results in a likewise increase in junction capacitance; a decrease in area or circumferential length results in a decrease in junction capacitance.

In the second and third types stated above, the light-receiving elements for use therein become greater in number than those of the first type even when a total sum of the areas of light acceptance surfaces is the same as that of the first type. Thus, a total of circumferential lengths becomes larger in value. Accordingly, the second and third types become greater in junction capacitance than the first type, resulting in a decrease in encoder response speed. It is thus apparent that with the prior art techniques, whenever an attempt is made to simply enhance the averaging effect, a plurality of light-receiving elements making up a light receipt unit increase in total value of junction capacitances thereof; adversely, when lowering this total value, the average effect becomes less.

When the optical grating of a scale is designed to become narrower in pitch in order to enable more precise measurement, it is inevitably required to narrow the pitch of light-receiving elements also in a way corresponding thereto. This requires layout of a great number of light-receiving elements each having a lessened width of light acceptance surface. In order to obtain by photoelectric conversion an electrical signal with its magnitude necessary for measurement, it is required that a total of the areas of light acceptance surfaces stays at a prespecified level or higher. Accordingly, when making the light-receiving elements narrower in pitch, the number of light-receiving elements increases resulting in an increase in total of circumferential lengths of light acceptance surfaces, which leads to an increase in total sum of junction capacitance values of multiple light-receiving elements. Hence, when causing the optical grating of the scale to become narrower in pitch, it is no longer possible to ignore the problem as to a decrease in encoder response speed.

The present invention was made in view of the problems stated above, and its object is to provide a photoelectric encoder capable of attaining the conflicting or "trade-off" requirements: enhancing the averaging effect, and lessening a total value of junction capacitances of a plurality of light-receiving elements.

In accordance with one aspect of this invention, a photoelectric encoder includes a light source, a scale including an optical grating for receiving irradiation of light from the light source, and a plurality of light-receiving elements for detection of a plurality of phase-different optical signals. The light-receiving elements are disposed so that these are relatively movable with respect to the scale in a measurement axis direction. Each element has its light acceptance surface for incidence of an optical signal as generated based on the light falling onto the optical grating. The plurality of light-receiving elements are arranged in an array. A light-receiving element placed at an end portion of the array is less in size than a light-receiving element at a central portion of the array.

According to the photoelectric encoder incorporating the principles of the invention, it is possible, by relatively lessening the size of light-receiving elements at the end portions of the array, to enhance on the array end side the averaging effect with respect to a change in light intensity occurring due to the light source's light intensity distribution. On the other hand, since the light-receiving element at the central portion of the array is arranged to be relatively large in size, it is possible to prevent increase in number of light-receiving elements. This makes it possible to avoid unwanted increase in total value of junction capacitances of a plurality of light-receiving elements.

In the photoelectric encoder in accordance with the invention, there is employable an arrangement which follows. The plurality of light-receiving elements are laid out along the measurement axis. The light-receiving element placed at the end portion of the array is less than the light-receiving element at the central portion of the array in size of the light acceptance surface in the measurement axis direction.

With this arrangement, in the plurality of light-receiving elements disposed along the measurement axis, it is possible to permit the light-receiving elements at the array end portions to be relatively less in size in the measurement axis direction. Thus it is possible to much lessen or minimize the size of light-receiving elements on the array end side in the measurement axis direction. This makes it possible to further enhance, on the end side, the averaging effect with respect to a change in light intensity occurring due to the light source's light intensity distribution. It is also possible to relatively enlarge the size in the measurement axis direction of the light-receiving element placed at the center of the array. This makes it unnecessary to increase the number of light-receiving elements in order to provide any required total value of the areas of light acceptance surfaces, thereby enabling preclusion of increase in total junction capacitance of plural light-receiving elements.

In the photoelectric encoder in accordance with the invention, this encoder further comprises an optical receipt chip including the plurality of light-receiving elements. This chip further includes an index grating having a light shield portion partly covering the light acceptance surface.

With this feature, even when those light acceptance surfaces at the central and end portions of the array are different in size from each other, each light-receiving element is capable of receiving a certain one of a plurality of optical signals, which has a specific phase assigned thereto.

In the photoelectric encoder in accordance with the invention, the optical receipt chip may be arranged to include a contact portion which underlies the light shield portion with electrical conductivity and which is connected to this light shield portion while being in contact with the light acceptance surface, and a wiring line connected to the light shield portion.

With this feature, the light shield portion of an index grating functions also as an electrical wiring lead to be connected to a light-receiving element. Thus it is possible to prevent reduction of the effective photosensitive area of light acceptance surface.

In the photoelectric encoder in accordance with the invention, this may be arranged so that the plurality of light-receiving elements are laid out along a direction at right angles to the measurement axis, wherein the light-receiving element placed at the end portion of the array is less than the light-receiving element at the central portion of the array in size of the light acceptance surface in the direction at right angles to the measurement axis.

With this feature, in regard to a plurality of light-receiving elements as laid out along the direction at right angles to the measurement axis direction, for the same reason as that in the case of plural light-receiving elements disposed along the above-noted measurement axis direction, it is possible to further enhance the averaging effect with respect to a change in light intensity on the array end side while at the same time making it possible to reduce or suppress an increase in total value of junction capacitances of the plurality of light-receiving elements.

In the photoelectric encoder in accordance with the invention, this may be arranged so that the plurality of light-receiving elements are organized into a plurality of sets which are different in light-receiving element size on a per-set basis, wherein the light-receiving elements that make up each set are continuously disposed at the same pitch and include light-receiving elements for detection of a plurality of phase-different optical signals.

With this feature, it is possible to arrange the light-receiving elements in such a manner that the end portion of the array becomes smaller in pitch than its central portion while letting the light-receiving elements within a set be kept constant in size and also establishing a well-balanced layout.

In the photoelectric encoder in accordance with the invention, this may be arranged so that, in a set of the plurality of sets which is located at an intermediate portion of the array between the set placed at the end portion of the array and the set at the central portion of the array, the size of a light-receiving element is greater than that of the set at the array end portion and yet less than that of the set at the center of the array.

With this feature, it is possible to appropriately change the light-receiving element size in a way pursuant to the amount of a change in light intensity occurrable due to the light source's light intensity distribution. This makes it possible to obtain, without having to increase the number of light-receiving elements, the averaging effect that is large enough to compensate for a light intensity change at a respective one of the set at the array end, the set at the array center and the set at the intermediate portion of the array.

In the photoelectric encoder in accordance with the invention, this may be arranged so that the sizes of the plurality of sets are set up respectively to ensure that the amount of a change in light intensity occurring due to a light intensity distribution on the plane of the array is kept constant on each set.

With this feature, it is possible to equalize in each set the averaging effect with respect to the amount of a change in light intensity occurring due to the light intensity distribution on the plane of the array.

Although the features above are some of the currently preferred forms of the photoelectric encoder in accordance with the invention, there is also available another form which follows. In summary, the another form of the photoelectric encoder in accordance with the invention includes a light source, a scale including an optical grating for receiving irradiation of light from the light source, an optical receipt chip which is relatively movable with respect to the scale in a measurement axis direction and which is for receiving irradiation of the light from the light source through the optical grating, an array of rows and columns of a plurality of light-receiving elements disposed both in the measurement axis direction and in a direction perpendicular to the measurement axis direction on the optical receipt chip, and a plurality of index gratings placed at front faces of the plurality of light-receiving elements respectively. The plurality of index gratings are mutually disposed along the measurement axis direction with a specified offset therebetween so that the relative movement permits a plurality of phase-different optical signals to be output from the plurality of light-receiving elements.

According to the another form of the photoelectric encoder of the invention, it is possible to enhance the averaging effect because of the fact that the plurality of light-receiving elements are laid out both in the measurement axis direction and in the direction at right angles thereto in such a manner that these are organized into an array. In addition, placing the index gratings on or above the front faces of respective light-receiving elements makes it possible to avoid unwanted increase in total value of junction capacitances of the plurality of light-receiving elements.

DETAILED DESCRIPTION OF THE INVENTION

Figure 1:
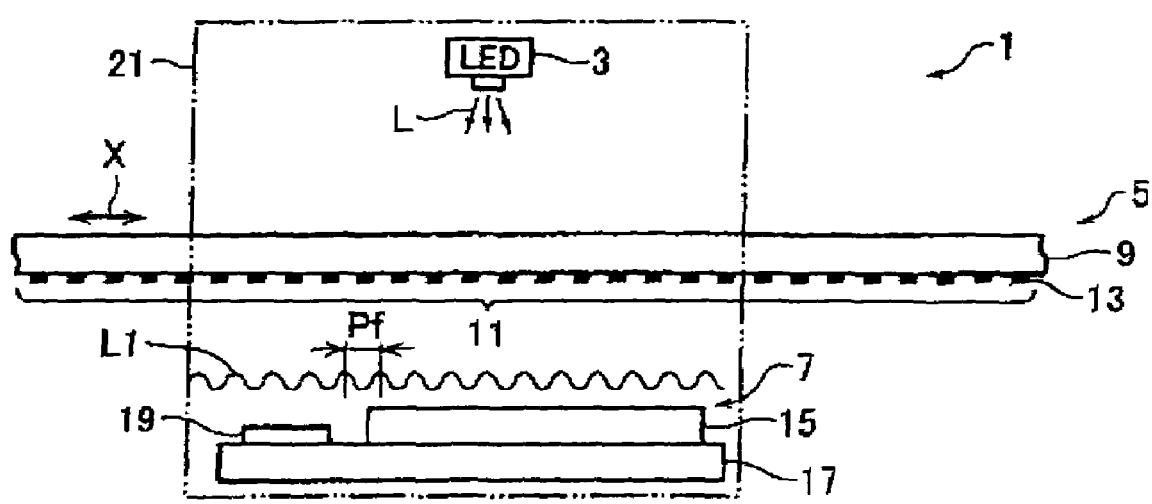
FIG. 1 is a diagram schematically showing a configuration of a photoelectric encoder in accordance with a first embodiment of the invention.

First to fifth embodiments of a photoelectric encoder in accordance with this invention will be explained with reference to the accompanying drawings below. Note here that in the drawings for explanation of the second to fifth embodiments, parts or components denoted by the same reference characters as those of their preceding embodiment are added the same reference characters, with explanations thereof omitted.

[First Embodiment]

FIG. 1 is a diagram schematically showing a configuration of a photoelectric encoder 1 in accordance with the first embodiment. Although a main feature of this embodiment lies in the structure of an optical receipt chip that is included in a light-receiving unit, an explanation will first be given of the photoelectric encoder 1 per se for purposes of facilitation of the understanding of this feature. First, an arrangement of the photoelectric encoder 1 will be set forth. This encoder 1 is generally structured from a light-emitting diode (LED) 3, a scale 5 and a light-receiving unit 7. The scale 5 and light-receiving unit 7 are disposed in an order of sequence closer to the LED 3.

The LED 3 is one example of a light source. Light L from LED 3 falls onto the scale 5. Scale 5 includes a transparent substrate 9, which is made of an optically transparent material, such as glass or the like. Its part is depicted in FIG. 1. An optical grating 11 is formed on a surface of transparent substrate 9, which is on the opposite side to the other substrate surface facing the LED 3 side. Optical grating 11 includes a plurality of light shielding portions 13, which are linearly disposed with a prespecified interval or "pitch" defined between adjacent ones thereof. Each light shield portion 13 extends in a direction perpendicular to the drawing sheet. Light shied 13 is made of a chosen metal (for example, chromium) or else.

The light-receiving unit 7 is disposed with a gap provided between itself and the scale 5. Light-receiving unit 7 includes an optical receipt chip—say, photosensor chip—15 which is positioned on the scale 5 side and also includes a printed circuit board 17 on which this chip is mounted. A plurality of photodiodes (sometimes referred to as "PDs" hereinafter) are formed within the photosensor chip 15, although not specifically illustrated herein. A respective one of these PDs has a light acceptance surface with photosensitivity, which faces the optical grating 11 side. PD is one example of a light-receiving element. In place of the PD, a photo-transistor may be used as the light-receiving element. An integrated circuit (IC) chip 19 for the arithmetic processing use is mounted on the circuit board 17. This IC chip 19 is operable to execute arithmetical processing of a position change amount based on optical signals as detected by a plurality of PDs of the photosensor chip 15.

The light-receiving unit 7 is attached to a holder 21 together with the LED 3. The holder 21 is designed so that it is movable and slidable along the elongate direction of the scale 5, indicated by "X" in FIG. 1. More specifically, the illustrative photoelectric encoder 1 measures a displacement amount while letting the holder 21 move with respect to the scale 5 that is immovably secured. Hence, the X direction becomes a measurement axis (this X direction will be referred to hereinafter as "measurement axis X"). Note here that the present invention is also applicable to another type of device which measures a displacement amount by causing the scale 5 to move while fixing LED 3 and light-receiving unit 7. Accordingly, the light-receiving unit 7 including the photosensor chip 15 is laid out so that this is relatively movable together with LED 3 with respect to scale 5 in the direction of measurement axis X.

A measurement operation of the photoelectric encoder 1 will next be explained in brief below. When light L is given off from the LED 3 and then falls onto the optical grating 11 of the scale 5, a light-and-shade pattern L1 takes place due to the presence of optical grating 11. This light-and-shade pattern L1 is irradiated onto the photosensor chip 15. In this state, the holder 21 is driven to move along the measurement axis X direction so that each photodiode (PD) formed on photosensor chip 15 detects a change of the light/shade pattern L1 thus created (i.e. an optical signal with a sinusoidal or "sine" waveform). More precisely, four phase-different optical signals are respectively sensed by their corresponding PDs—namely, an optical signal with phase "A" (zero degrees), an optical signal with phase "B" (90 degrees) that is shifted or offset in phase by 90 degrees from the phase A, a light signal with phase "AA" (180 degrees) that is phase-shifted by 180 degrees from the phase A and a light signal with phase "BB" (270 degrees) as phase-shifted by 270 degrees from the phase A. In this way, each PD receives a certain one of multiple phase-different light signals which has its unique phase assigned thereto.

An electrical signal produced by receipt of each optical signal is sent forth toward the IC chip 19. IC chip 19 performs specified processing (including removal of DC components) with respect to the phases A and B; thereafter, a displacement amount is arithmetically determined based on the phases A and B thus processed. This result is output to a display unit, not shown. The above is the operation of the photoelectric encoder 1.

Figure 2:
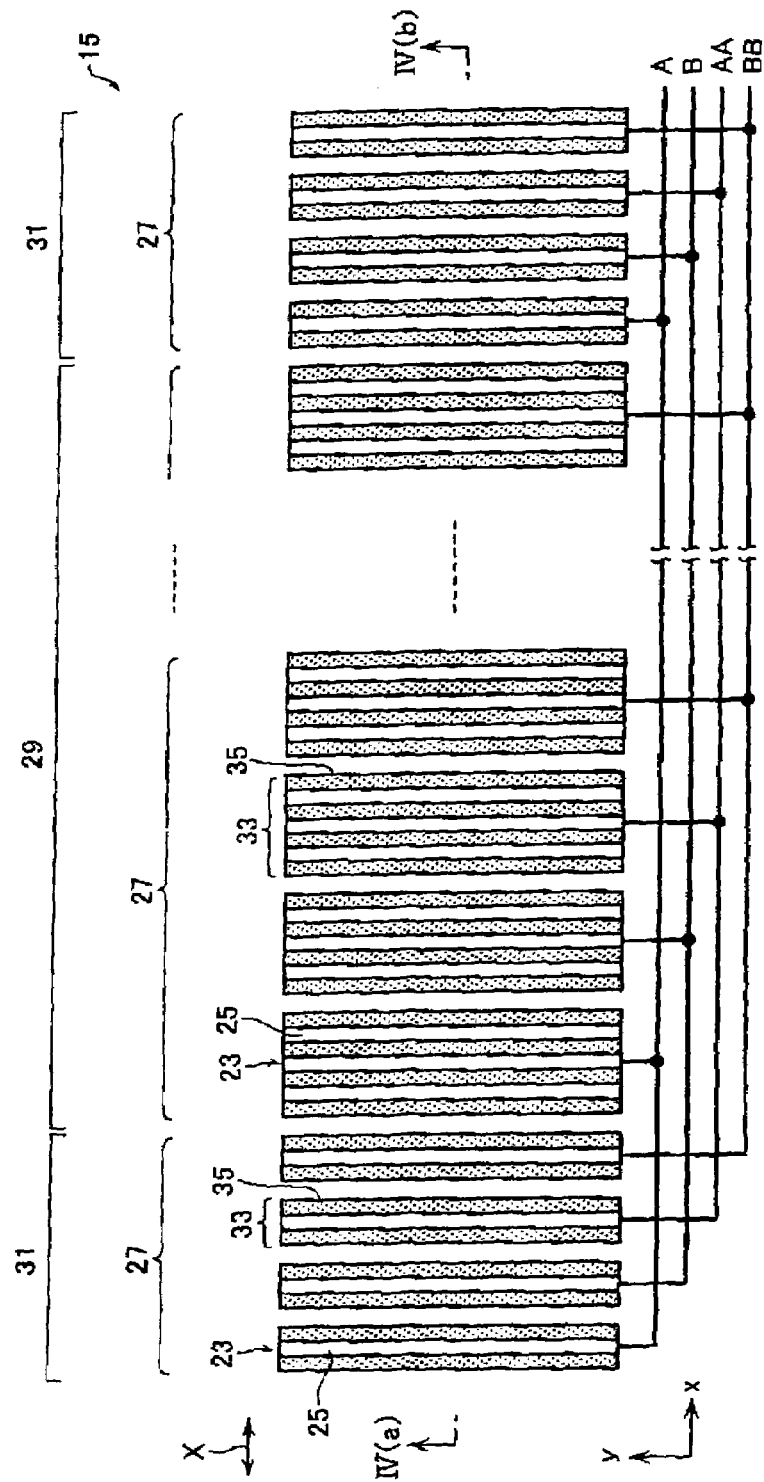
FIG. 2 is a diagram pictorially representing a plan view of the entire part of an optical receipt chip when looking at it from the optical grating side of FIG. 1.
Figure 3:
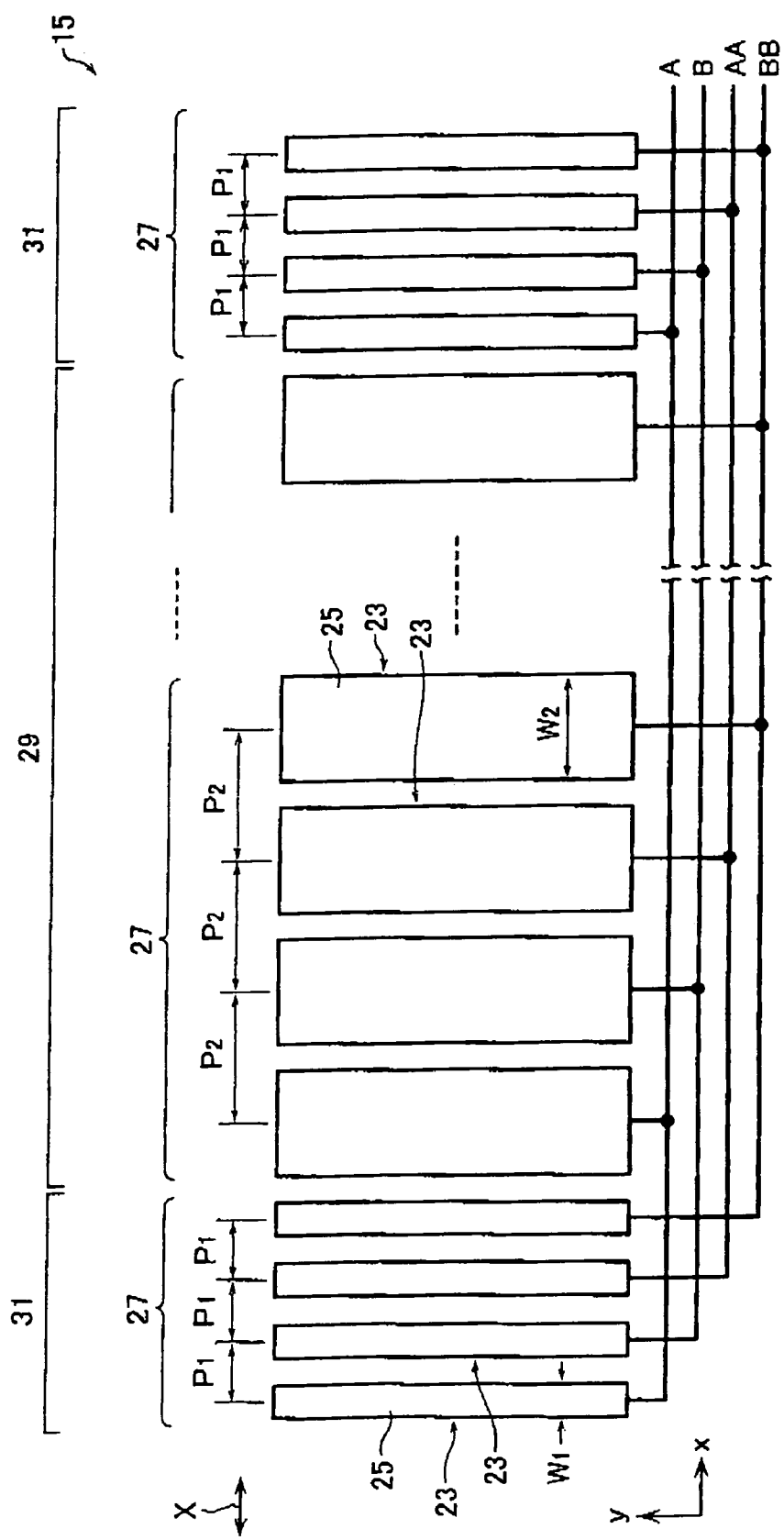
FIG. 3 is a pictorial representation of an array of photodiodes only in the structure of FIG. 2.
Figure 4:
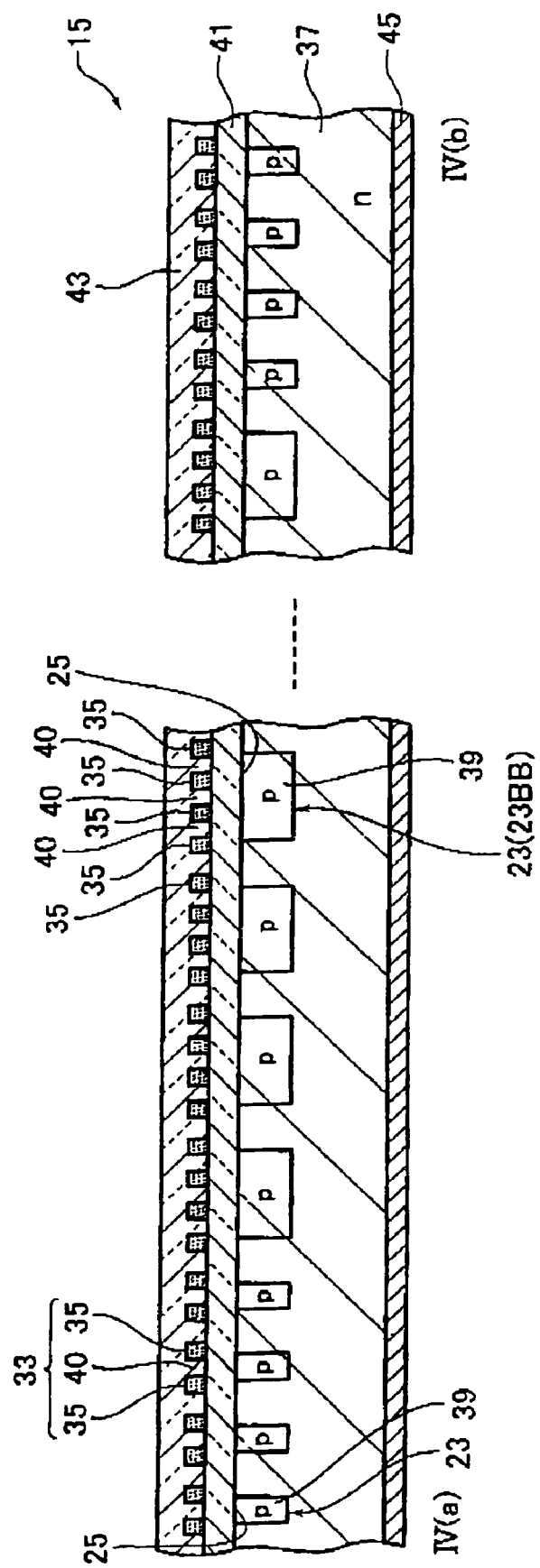
FIG. 4 is a pictorial representation of a cross-sectional view of the optical receipt chip shown in FIG. 2, as taken along line IV(a)–IV(b).

Now then, a principal feature of the first embodiment lies in the photosensor chip 15, which will be explained in detail. FIG. 2 pictorially represents a plan view of an entirety of the photosensor chip 15 when viewing it from the optical grating side. FIG. 3 depicts only an array of photodiodes 23. FIG. 4 is a cross-sectional view of the sensor chip 15 shown in FIG. 2 as taken along line IV(a)–IV(b).

As shown in FIG. 4, the photosensor chip 15 has an n-type semiconductor substrate 37. This substrate 37 has its one surface, in which p-type diffusion regions 39 are formed with an interval provided between adjacent ones thereof. A junction portion between the semiconductor substrate 37 and a diffusion region 39 becomes a photodiode (PD) 23. A plurality of PDs 23 are formed in substrate 37 to have an array-like layout pattern.

A region of the one surface of the semiconductor substrate 37 in which a p-type diffusion region 39 is formed becomes a light acceptance surface 25. Additionally, in order to make certain of electrical separation between adjacent p-type diffusion regions 39 (that is, element isolation of each photodiode 23), a heavily-doped n ($n^+$) type diffusion region may be formed between diffusions 39 in semiconductor substrate 37. The one surface of substrate 37 is covered or coated with a dielectric film 41, such as a silicon oxide film, so that film 41 covers diffusions 39.

When planarly viewing the plurality of PDs 23, as shown in FIGS. 2 and 3, these PDs 23 are arranged along the measurement axis X on an "xy" plane which opposes the optical grating 11 and are organized into an array. Note here that an "x" axis is identical in direction to the measurement axis X as has been explained in FIG. 1.

Certain ones of the PDs 23 are regarded as a one set 27, which are the following four PDs: a PD 23 for receiving an optical signal with the phase "A," a PD 23 for receipt of a light signal with phase "B," a PD 23 for receipt of a light signal with phase "AA," and a PD 23 for receipt of a light signal with the phase "BB." A plurality of PD sets 27 are placed at or near a central portion 29 of the array, along the measurement axis X direction. A single set 27 is disposed at a respective one of the opposite terminate end portions 31 of the array, which are on the both sides of the central portion 29 of the array. PDs 23 making up the set 27 at one array end 31 are queued at pitch $P_1$, which is less than the pitch $P_2$ of PDs 23 making up the set 27 placed at the center 29 of the array. On the other hand, within each set 27, PDs 23 are continuously put in place at the same pitch. This permits establishment of well-balanced layout of the PDs 23 in each set 27.

Optical signals which are generated based on the light falling onto the optical grating 11 (i.e. light signals with the phases A, B, AA and BB) are guided to hit respective light acceptance surfaces 25. In other words, under the condition that the light-and-shade pattern L1 shown in FIG. 1 is irradiated onto the photosensor chip 15, a certain one of a plurality of phase-different light signals as generated during movement of the holder 21, which has its unique phase assigned thereto, is guided to fall onto each light acceptance surface 25. The shape of light acceptance surface 25 is a rectangle with its long sides extending in a "y" direction. The size of a light acceptance surface 25 in the measurement axis X direction (that is, the width of acceptance surface 25) is arranged so that its value at the array center 29 is different from that at the array end 31. More specifically, the width $W_1$ of light acceptance surface of a PD 23 disposed at the array end 31 is made less than the width $W_2$ of that at the array center 29.

Next, an explanation will be given the index gratings 33, with reference to FIGS. 2 and 4. The photosensor chip 15 has such index gratings 33 that are formed on the dielectric film 41 in such a manner as to cover respective light acceptance surfaces 25. An index grating 33 has a plurality of spaced-apart light shielding portions 35 which are placed above each light acceptance surface 25 and extend in the y direction. The light shield portions 35 may have the nature for blocking transmission of light rays. Accordingly, light shields 35 may be made of optically opaque materials, including metals (for example, chromium or aluminum) or resins.

A portion residing between neighboring light shield portions 35 above a light acceptance surface 25 is for use as a light-transmissible or translucent portion 40. Hence, it can be said that index gratings 33 have light shields 35 each partially covering a light acceptance surface 25. At least two light shields 35 are combined together into a group and are disposed above a single light acceptance surface 25, thereby making up a one index grating 33.

Each light acceptance surface 25 is such that a translucent portion 40 is placed at a location corresponding to an optical signal having its phase assigned thereto, with light shield portions 35 residing at the remaining locations. Explaining more practically, one example is as follows. At a PD 23BB for receipt of an optical signal with phase BB, a translucent portion 40 is placed at a location corresponding to the light signal with phase BB. Whereby, this PD 23BB is insensitive to any one of the other light signals with phases A, B and AA. Although the array's central portion 29 and end portion 31 are different from each other in width of PD 23, any deviance or irregularity of light signal phase is precluded by equalizing the pitch of light shields 35.

As shown in FIG. 4, a protective film 43 such as a silicon oxide film or silicon nitride film is formed to cover the index gratings 33. A common electrode (e.g., Au electrode) 45 is entirely formed on the other surface of the semiconductor substrate 37.

Figure 5:
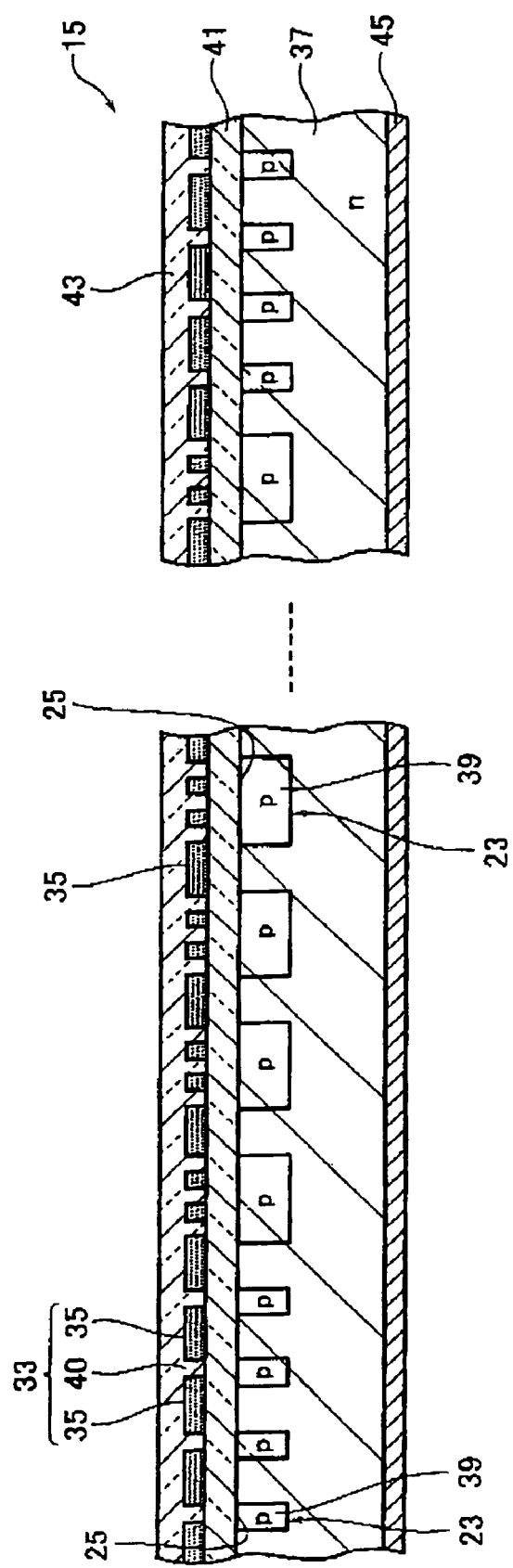
FIG. 5 is a diagram showing one modified example of the index gratings in accordance with the first embodiment.

A modified example of the ensemble of index gratings 33 will be explained using FIG. 5. FIG. 5 is a pictorially represented cross-sectional view of a photosensor chip 15. This view corresponds to FIG. 4. A portion between neighboring light acceptance surfaces 25 is covered with a light shield portion 35. Rays of light falling onto the semiconductor substrate 37 from between the neighboring acceptance surfaces 25 can become the cause for generation of noises in some cases. According to this modification, it is possible to prevent incidence of light into the substrate 37 from between the neighboring acceptance surfaces 25.

The photoelectric encoder 1 in accordance with the first embodiment has main effects and advantages which follow.

Figure 6:
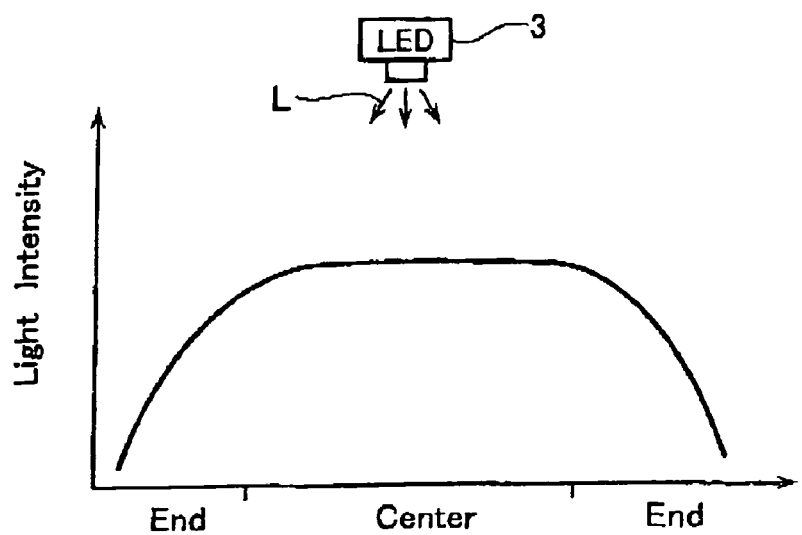
FIG. 6 is a graph showing a plot of the light intensity at respective positions of a PD array formed on an optical receipt chip.

(1) According to the first embodiment, it is possible to enhance, on the array end 31 side, the averaging effect with respect to a change in light intensity occurring due to a light intensity distribution of the light source while at the same time preventing unwanted increase in total junction capacitance value of the plurality of PDs 23 making up the photosensor chip 15. This will be explained in detail below. FIG. 6 is a graph showing a plot of light intensity at respective positions of the PD array formed on a photosensor chip. A light source formed of the light-emitting diode (LED) 3 has a light intensity distribution as shown in FIG. 6 due to constraints such as the size of light source. As apparent from viewing this distribution, the array end portion is less in light intensity than the array center portion; in addition, the former is greater than the latter in change amount of light intensity (inclination or gradient of a characteristics curve). Due to this, if the pitch of PDs is relatively large, then a difference in DC component of a photoelectric current to be generated at each PD becomes greater at the array end. This may be reworded in a way such that the light signals with phases A, B, AA and BB are different from one another in DC component value of photocurrent—additionally, such different becomes greater. This badly serves as a bar to achievement of high-precision measurability of the photoelectric encoder.

Using a photosensor chip with relatively lessened PD pitch makes it possible to avoid the above-noted problem. However, in the case of manufacture of such photosensor chip by disposing an array of multiple PDs within a specified dimension of region, if the PD pitch is made relatively smaller then the number of PDs increases accordingly, resulting in an increase in total of junction capacitance values of the PDs making up the sensor chip.

The inventor turned our attention to the fact that the end portions of the array are greater than a central portion thereof in amount of a change in light intensity (gradient of the curve of FIG. 6) occurring due to a light intensity distribution of the light source. More specifically, as shown in FIG. 3, the first embodiment is specifically arranged to cause the pitch of PDs 23 placed at end portions 31 of the array to be relatively small in value, thereby enhancing the averaging effect for a light intensity change on the array end 31 side. On the other hand, an increase in PD number is suppressed by relatively enlarging the pitch of PDs 23 placed at or near the center 29 of the array, thereby preventing increase of total value of junction capacitances of plural PDs 23 making up the photosensor chip 15.

(2) According to the first embodiment, as shown in FIG. 3, the width $W_1$ of light acceptance surface 25 of a PD 23 disposed at the end portion 31 of the array is made less than the width $W_2$ of that of a PD 23 at the array center 29. This makes it possible to appreciably lessen the pitch $P_1$ of PD 23 on the array end 31 side. Thus it is possible to further enhance the averaging effect with respect to a change in light intensity on the end 31 side. On the other hand, letting width $W_1$ be less than width $W_2$ results in that the width $W_2$ of light acceptance surface of PD 23 disposed at the array center 29 becomes relatively larger by a degree corresponding to such a decrease in width. This avoids the need to increase the number of PDs 23 in order to provide the required total value of areas of light acceptance surfaces 25 concerned. Thus it is possible to suppress unwanted increase in total junction capacitance of such plural PDs 23.

(3) As stated previously in Paragraph (2), the first embodiment is such that the central portion 29 of the array is different in width of light acceptance surface 25 from the array end portion 31. By positioning the index gratings 33 shown in FIG. 2 above the acceptance surfaces 25, it becomes possible for each PD 23 to receive and sense only a certain one of phase-different optical signals which has its unique phase assigned thereto.

[Second Embodiment]

Figure 7:
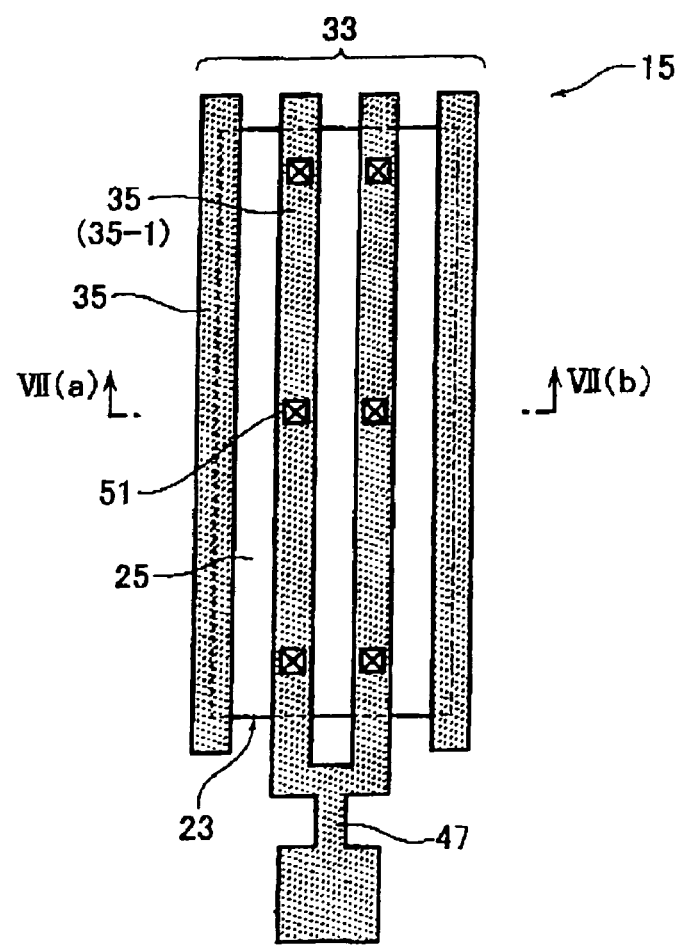
FIG. 7 is a pictorially represented plan view showing the layout relationship of a single light acceptance surface and an index grating at or near the central of a PD array formed on an optical receipt chip of a photoelectric encoder in accordance with a second embodiment.
Figure 8:
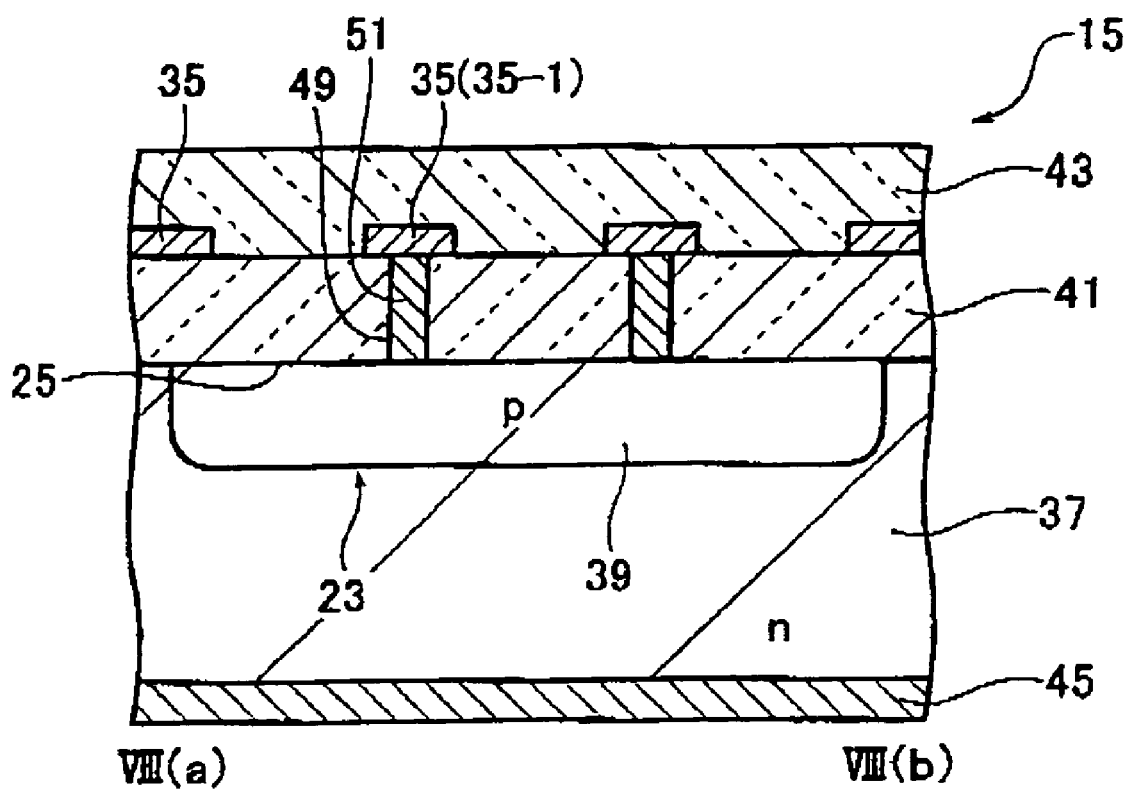
FIG. 8 is a pictorial cross-sectional view of the structure shown in FIG. 7 as taken along line VIII(a)–VIII(b).

An explanation of a second embodiment will be given while focusing it on differences from the first embodiment. FIG. 7 is a plan view pictorially showing a layout relationship of a light acceptance surface 25 and its associative index grating 33 at a central portion 29 of a PD array which is formed on a photosensor chip 15 of a photoelectric encoder in accordance with the second embodiment. FIG. 8 is a pictorial cross-sectional view of the structure shown in FIG. 7 as taken along line VIII(a)–VIII(b).

In the second embodiment, light shield portions 35 of an index grating 33 become part of an electrical wiring line for connection to a photodiode 23. A detailed explanation of it is as follows. The light shield portions 35 are made of a metal with high conductivity, such as aluminum or the like. Four light shield portions 35 that are placed above a light acceptance surface 25 and a wiring line 47 reside at the same layer. These are simultaneously fabricated by patterning. The light shields 35 include two central light shields 35-1, which are patterned so that these are connected together to the wire 47.

Contact holes 49 are formed in the dielectric film 41 between the light shield portions 35-1 and light acceptance surface 25. In these contact holes 49, contact portions 51 are formed which consist essentially of conductive plugs (e.g., aluminum). These contacts 51 underlie the light shields 35-1 and are connected thereto while being in contact with light acceptance surface 25. Accordingly, the wiring line 47 is connected to photodiode 23 by shields 35-1 and contacts 51. Note here that although in this embodiment the conductive plugs are formed of contacts 51, another arrangement is available which follows: during fabrication of a film for later use as the light shields 35-1 on the dielectric film 41, let this film be buried in contact holes 49 and then use buried film portions as the contacts required.

The second embodiment has the following advantages in addition to the advantages similar to those of the first embodiment, in the case of a structure which does not utilize the light shield portions 35-1 for connection between the wiring line 47 and photodiode 23, this connection must require additional fabrication of a new conductive film on or above the light acceptance surface 25 at the same layer as light shields 35. Due to the presence of this conductive film, the light acceptance surface 25 decreases in its effective or "net" photosensitive area. In contrast, the second embodiment is arranged to employ conductive light shields 35-1 for connection between wire 47 and photodiode 23. Thus it is possible to preclude reduction of the net photosensitive area of acceptance surface 25.

Additionally, in the case of a structure using none of the above-noted light shields 35-1, the contacts 51 are not present in the cross-section of FIG. 8. Accordingly, there is formed a parasitic capacitance component which is structured so that the dielectric film 41 is interposed or "sandwiched" between light shields 35-1 and p-type diffusion region 39. This causes the encoder to decrease in response speed. In contrast, the second embodiment is such that the light shields 35-1 and p-type diffusion 39 are connected together by contacts 51. Thus such parasitic capacitance hardly takes place.

[Third Embodiment]

Figure 9:
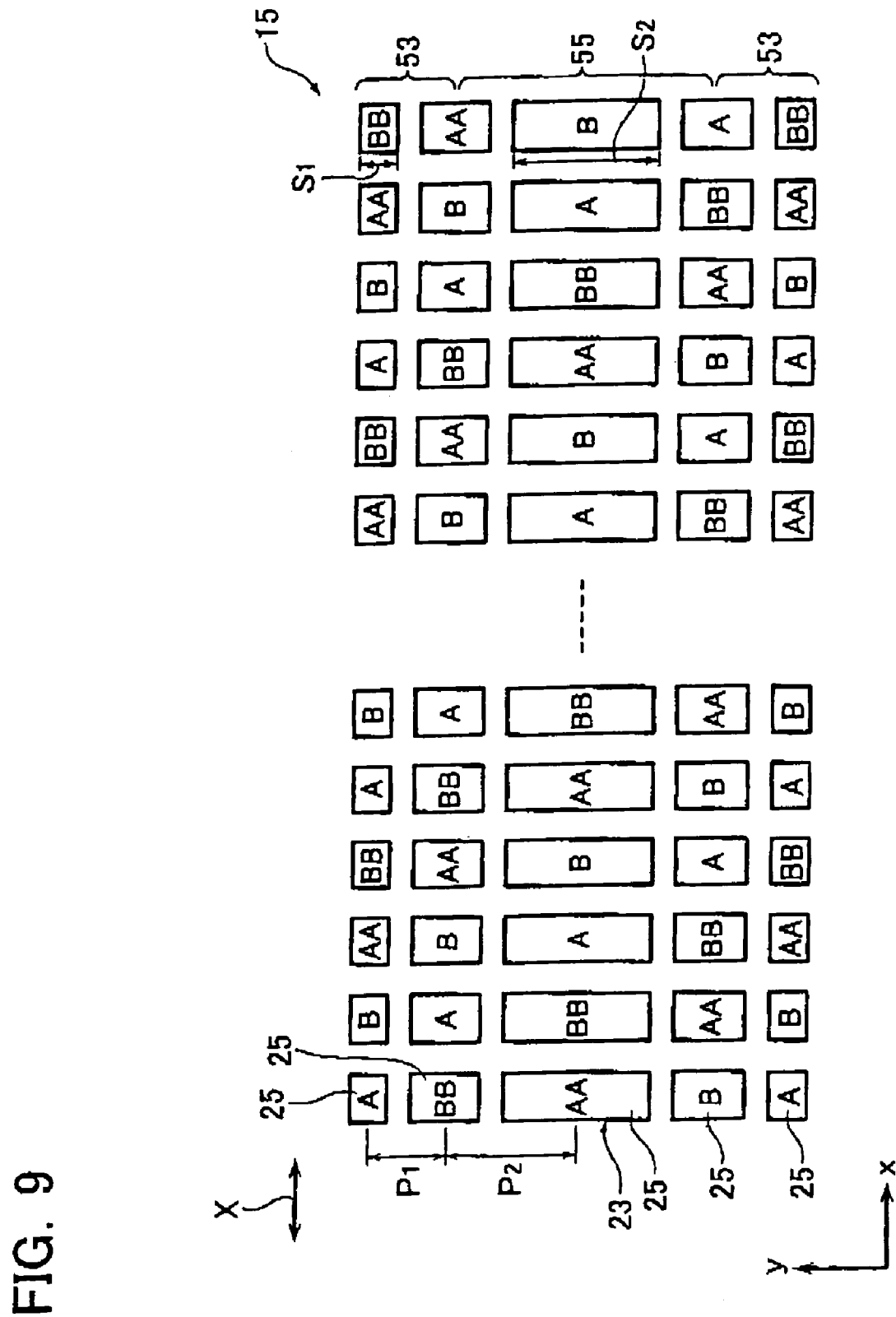
FIG. 9 is a pictorial plan view of a photodiode array of an optical receipt chip in accordance with a third embodiment when viewing it from the optical grating side thereof.

Regarding a third embodiment, its explanation will be given while focusing it on differences from the first embodiment. FIG. 9 is a plan view pictorially representing a photodiode (PD) array of a photosensor chip 15 of the third embodiment when looking at it from the optical grating side. In this drawing, illustration of index gratings is omitted.

Figure 10:
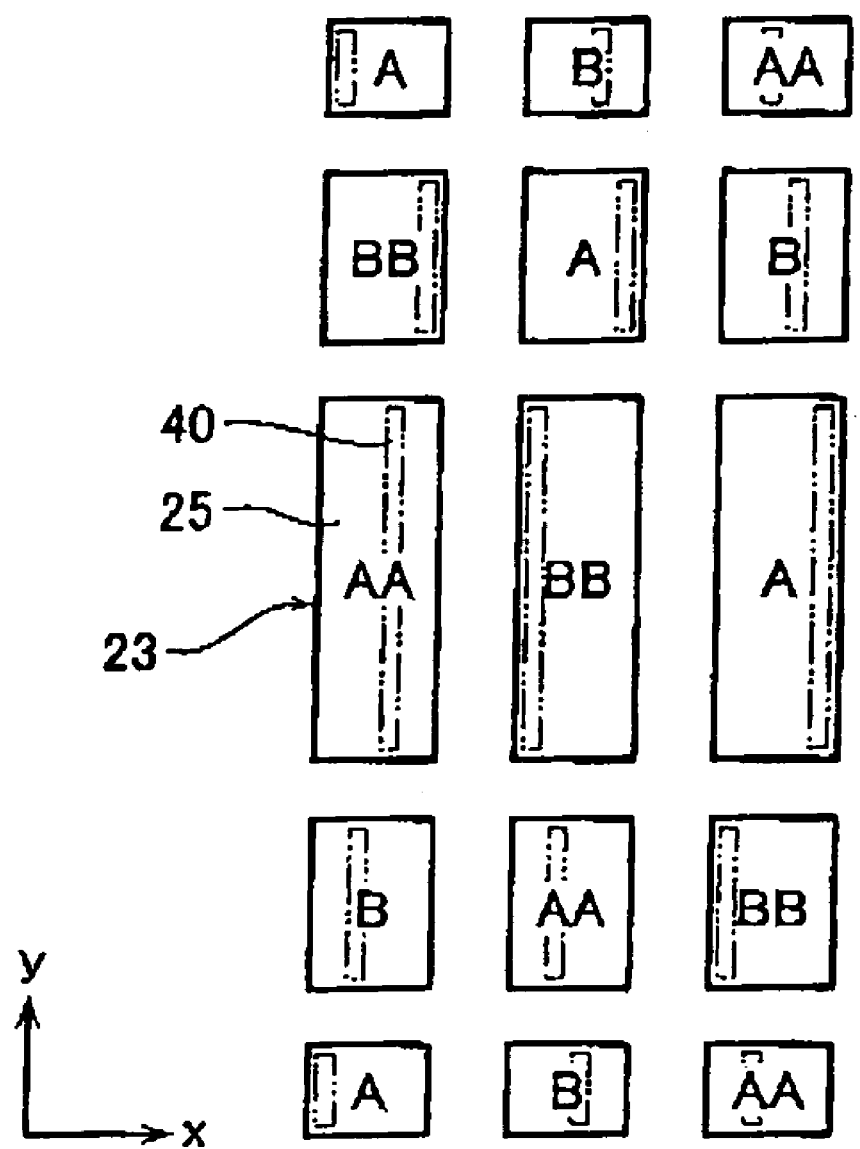
FIG. 10 is a plan view of part of the optical receipt chip of the third embodiment.

FIG. 10 is a plan view of part of the photosensor chip 15 in accordance with the third embodiment. In this drawing, there is shown the positional relationship of light acceptance surfaces 25 versus translucent portions 40 of index gratings. Those gratings disposed at front faces of light-receiving elements are called the index gratings.

As shown in FIG. 9, light acceptance surfaces 25 of a plurality of PDs 23 are laid out two-dimensionally on the "xy" plane facing the optical grating. In other words, plural PDs 23 are disposed in a matrix array with rows and columns. This may also be reworded in a way which follows: multiple PDs 23 are laid out both in the "x" direction (i.e., measurement axis direction) and in the "y" direction (i.e. direction at right angles to the measurement axis direction) on the photosensor chip 15 and thus organized into an array-like pattern. Light acceptance surfaces 25 for incidence of optical signals with the phases A, B, AA and BB are denoted by "A," "B," "AA" and "BB," respectively. This is for indication of which phase of light signal falls onto which one of the acceptance surfaces. Obviously, there are no such indications on the real acceptance surfaces 25. The acceptance surfaces 25 used for the phases A, B, AA and BB are periodically laid out in the x and y directions.

As shown in FIG. 10, light acceptance surfaces 25 used for different phases are aligned in the y direction. By offsetting translucent portions 40 in phase, each PD 23 is enabled to receive and sense a light signal with its phase corresponding thereto. In this way, on each acceptance surface 25, a translucent portion 40 is positioned at a location corresponding to a light signal having its phase assigned thereto, with the light shield portions of an index grating being placed at the other locations. More specifically, index gratings are such that one is disposed at the front face of each PD 23. These index gratings are laid out with a prespecified offset between adjacent ones thereof in the measurement axis X direction to thereby ensure that a plurality of phase-different optical signals are output from the plural PDs 23 during movement of the holder 21 along the measurement axis X. Although a single translucent portion 40 overlies each light acceptance surface 25, a plurality of ones may alternatively be provided.

As shown in FIG. 9, in the y direction which is the direction at right angles to the measurement axis X, the pitch $P_1$ of PDs 23 disposed at an end portion 53 of the array is made less than the pitch $P_2$ of PDs 23 at a central portion 55 of the array. With this feature, the following advantages are obtainable: (1) at the array end 53 in the y direction, it is possible to enhance the averaging effect with respect to a change in light intensity; (2) at the array center 55, the pitch of PDs 23 is relatively large so that it is possible to reduce the number of PDs 23 to thereby enable prevention of increase in total of junction capacitances of plural PDs 23.

A PD 23 placed at the array end 53 has a size $S_1$ of its light acceptance surface 25 in the direction at right angles to the measurement axis X (that is, the y direction which is perpendicular to the measurement axis X), this size S1 is less than a size $S_2$ of that of a PD 23 placed at or near the array center 55. Accordingly, for the same reason as in the case of the plurality of PDs 23 disposed along the measurement axis X direction as has been explained in the first embodiment, it is possible for the plural PDs 23 laid out along the y direction to further enhance the averaging effect with respect to a change in light intensity on the array end 53 side while at the same time making it possible to restrain or minimize unwanted increase of the total value of junction capacitances of the plural PDs 23.

Also importantly, each of the light acceptance surfaces 25 used for the phases A, B, AA and BB is disposed obliquely with respect to the measurement axis X. And, the acceptance surfaces 25 used for phases A, B, AA and BB are periodically laid out in an oblique or diagonal direction of the measurement axis X. In this way, those PDs 23 for receipt of optical signals with the same phase are placed obliquely relative to the measurement axis X while PDs 23 for receipt of phase-different light signals are periodically arranged in the diagonal direction of the measurement axis X. Hence, the layout of PDs 23 for each phase use may be made uniform or "uniformized," thereby making it possible to enhance the averaging effect. Uniformizing the layout of PDs 23 for each phase use is also achievable by randomly positioning the PDs 23 for each phase use. However, in comparison with such random layout, it is possible for the third embodiment to easily realize the uniformization of the layout of PDs 23.

[Fourth Embodiment]

Figure 11:
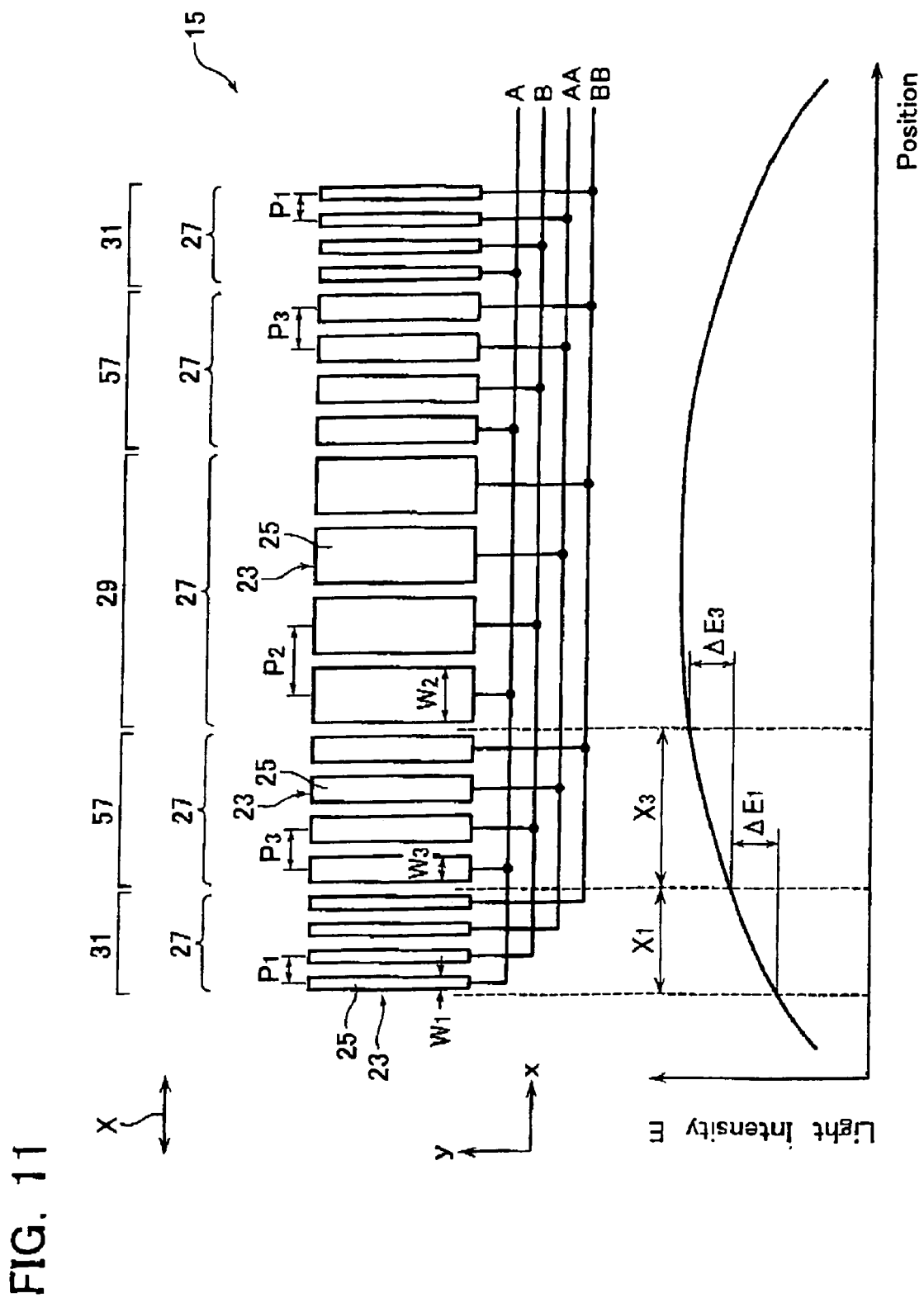
FIG. 11 shows a pictorial plan view of a photodiode array of an optical receipt chip of a fourth embodiment, along with a graph showing a plot of light intensity as a function of PD location.

As for a fourth embodiment, an explanation will be given while focusing it on differences from the first embodiment. FIG. 11 is a pictorially represented plan view of a photodiode (PD) array of a photosensor chip 15 of the fourth embodiment This view corresponds to FIG. 3.

In a PD set 27 at an intermediate or "midway" portion 57 of the PD array which is between the central portion 29 and end portion 31 of the array, the layout pitch $P_3$ of PDs 23 is made greater than the pitch $P_1$ and yet less than the pitch $P_2$. Similarly the width $W_3$ of PD 23 is larger than the width $W_1$ and yet smaller than width $W_2$.

Some effects and advantages of the fourth embodiment will be set forth below.

(1) A graph presented below the plan view of photosensor chip 15 in FIG. 11 indicates a plot of light intensity E at respective positions of the PD array of sensor chip 15. This graph corresponds to FIG. 6. The mid portion 57 of the array is less than the array end portion 31 in light intensity change amount (gradient of the characteristics curve). Owing to this, it is possible to obtain sufficiently significant averaging effect without having to make the mid part 57 more dense than the array end 31 in pitch of PDs 23. On the other hand, a change mount of light intensity at the mid part 57 of the array is greater than that of the array center 29. Hence, if the pitch of PDs 23 at mid part 57 is simply made equal to that at the array center 29, then it is no longer possible to obtain any sufficient averaging effect.

Consequently in the fourth embodiment, the pitch of PDs 23 is made variable in a way conformity with the change amount of the light intensity. With this feature, it is possible—in each of the set 27 at the array center 29, the set 27 at mid part 57 and the set 27 at end part 31—to obtain, without increasing the number of PDs 23, sufficient averaging effect with respect to a change in light intensity occurring due to a light intensity distribution on the surfaces of array portions 29, 31 and 57. Note here that this light intensity distribution is caused by the light source, for example.

Also note that the graph (light intensity distribution) of FIG. 11 may be prepared based on actually measured values or alternatively based on model values of a distribution, such as Gaussian distribution.

(2) In the fourth embodiment, the size $X_3$ in the measurement axis X direction of a PD set 27 at the mid part 57 and the size $X_1$ in the measurement axis X direction of a set 27 at the array end part 31 are adequately determined respectively in such a manner that the change amount $\Delta E_3$ of light intensity on the set 27 at array mid part 57 becomes equal to the change amount $\Delta E_1$ of that at the array end 31. Thus it is possible to permit the set 27 of array end 31 and the set 27 at mid part 57 to be the same as each other in averaging effect with respect to such light intensity change amount. This makes it possible to improve the measurement accuracy.

It should be noted that in the fourth embodiment, the change amount of light intensity on the set 27 of the array center 29 is much less than those of the mid part 57 and end part 31. This makes it difficult to set up the size in the measurement axis X direction of the set 27 at the center 29 in such a way that the light intensity change amount at center 29 becomes the same as that at mid part 57 and end part 31. For this reason, in the fourth embodiment, the set 27 of array center 29 is not taken into consideration for setup of the size of set 27 in measurement axis X direction. Note however that if the light intensity change amount on the set 27 at center 29 is relatively large then it is preferable to take account of the set 27 of center 29 also.

[Fifth Embodiment]

Figure 12:
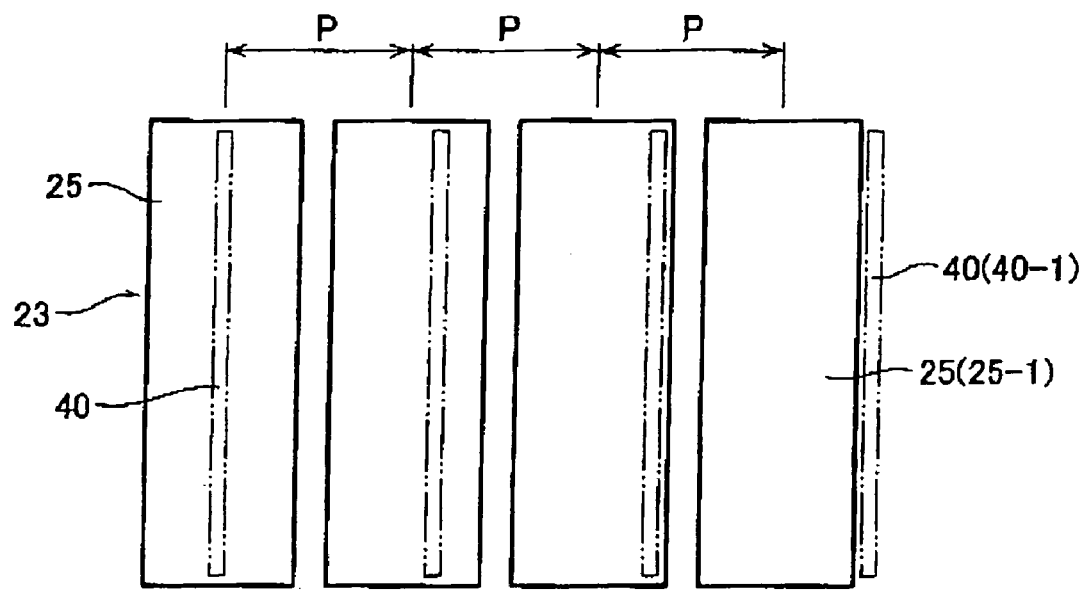
FIG. 12 is a plan view of part of an optical receipt chip for comparison with a fifth embodiment.
Figure 13:
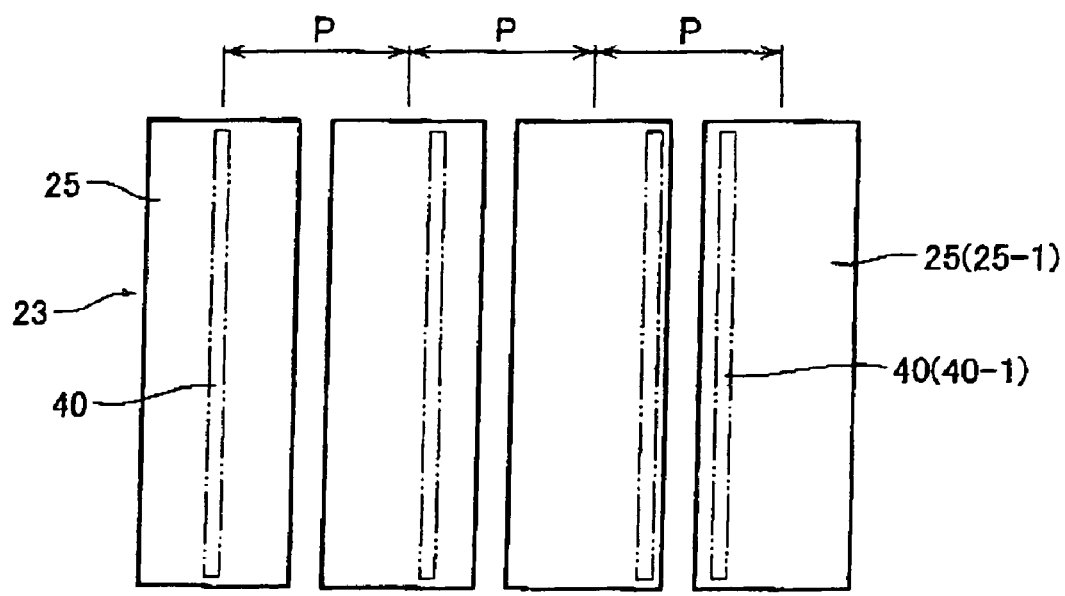
FIG. 13 is a partial plan view of an optical receipt chip of the fifth embodiment.

FIG. 12 is a plan view of part of a photosensor chip used for comparison with a fifth embodiment. FIG. 13 is a partial plan view of a photosensor chip of the fifth embodiment. In the first to fourth embodiments stated supra, the layout pitch P of PDs 23 is determined based on the change amount of light intensity. On the other hand, the position of a translucent portion 40 of index grating 33 is determined based on the phase of an optical signal. Accordingly, at certain light acceptance surface such as a surface 25-1 shown in FIG. 12, it will possibly happen that a translucent portion 40-1 fails to overlie the acceptance surface 25-1.

Consequently, the fifth embodiment shown in FIG. 13 is specifically arranged in a way which follows: in regard to translucent portions 40-1, these translucent portions 40-1 are shifted in position to reside at the front and rear positions of a location for incidence of optical signals with the same phase to thereby ensure that each translucent part 40-1 overlies a light acceptance surface 25-1.

Figure 14:
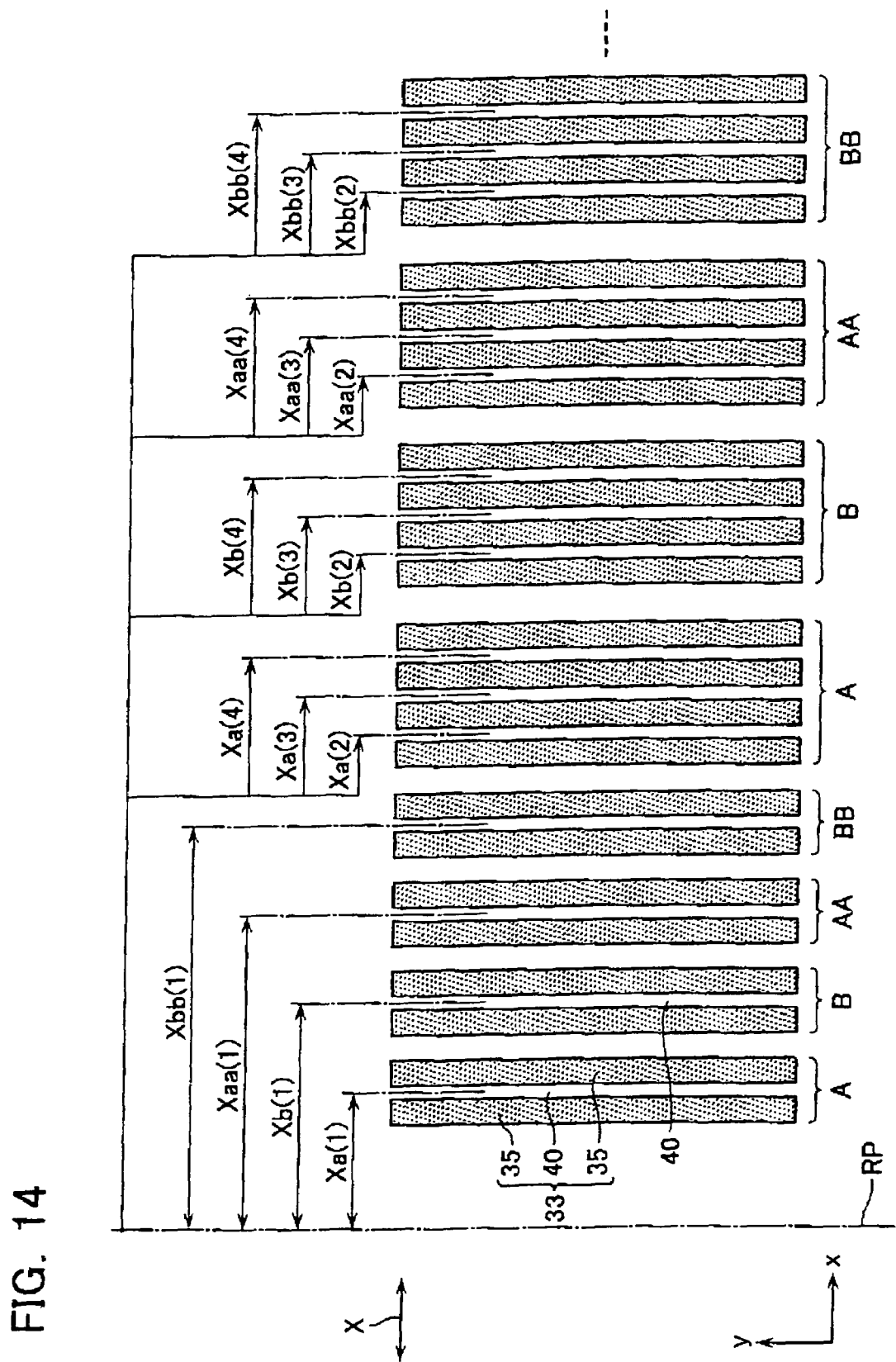
FIG. 14 is a plan view of one exemplary layout pattern of index gratings in accordance with the fifth embodiment.
Figure 15:
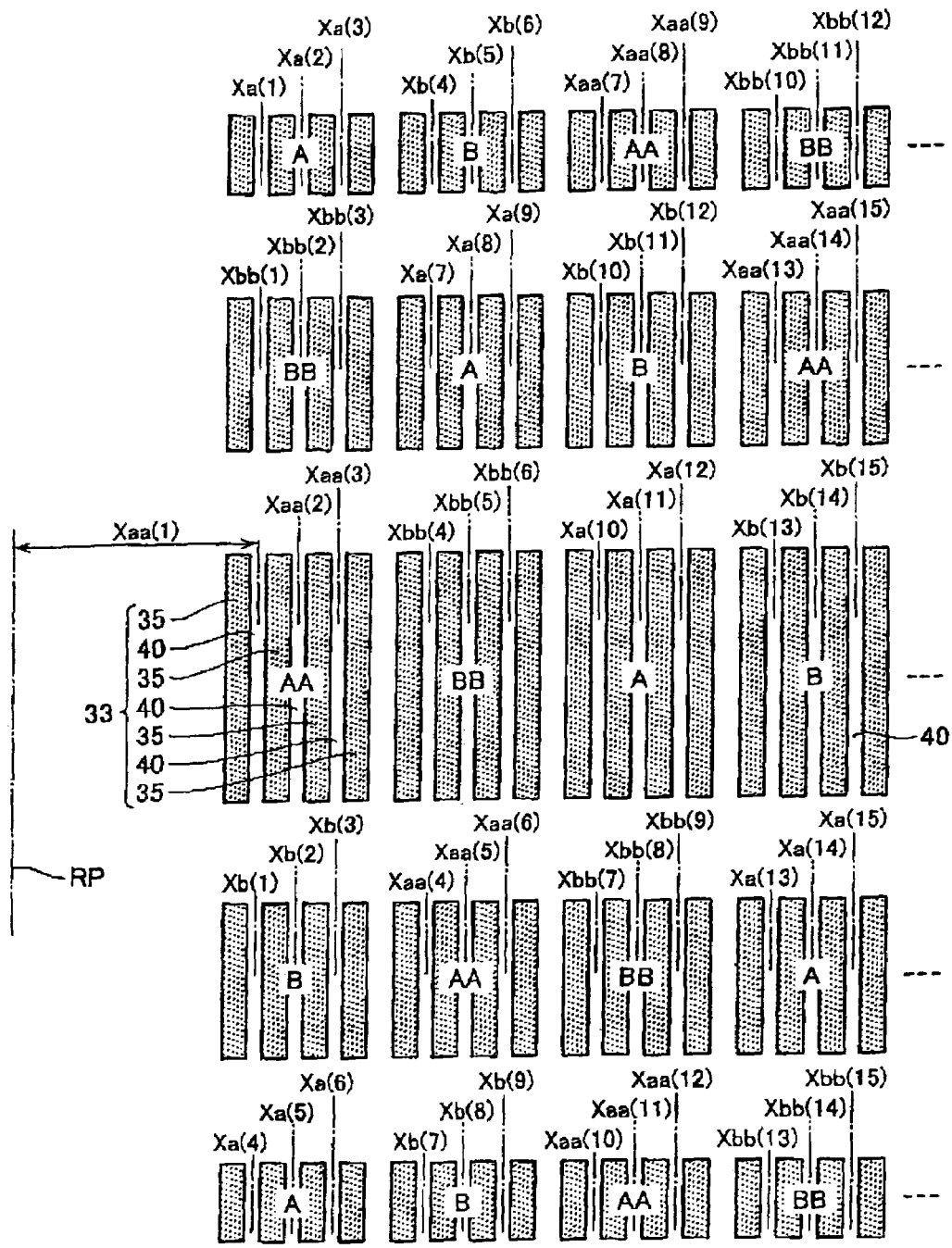
FIG. 15 is a plan view of another layout example of the index gratings in accordance with the fifth embodiment.

A detailed explanation of the fifth embodiment is as follows. FIG. 14 is a plan view of an exemplary layout pattern of index gratings 33 in accordance with the fifth embodiment. The index gratings 33 are laid out along the x direction. These index gratings 33 may be disposed on the photosensor chip 15 of FIG. 3. Also see FIG. 15, which is a plan view of another exemplary layout pattern of the index gratings 33 in accordance with the fifth embodiment. Index gratings 33 are arranged along both the x direction and the y direction—that is, organized into a matrix array with rows and columns. These index gratings 33 may be laid out on the photosensor chip 15 of FIG. 9. Note that in FIG. 15, the positions of translucent portions 40 of those index gratings 33 disposed along the y direction are equally represented in each phase. This is to avoid complexity of illustration only. Actually there is a phase difference therebetween.

The position of a translucent part 40 is determinable by a calculation scheme as will next be explained below. Firstly, arbitrarily determine a reference position RP in the x direction on the photosensor chip 15. Typically the reference position RP as selected herein may be (1) a virtual center line (mechanical center line) of the sensor chip 15 which is drawn on the plane of sensor chip 15 or (2) a distal end face of chip 15.

Let distances from the reference position RP to translucent portions 40 used for respective phases be represented as "Xa(k)," "Xb(k)," "Xaa(k)" and "Xbb(k)," where "k" is the number indicative of an order of translucent parts 40. For example, Xa(1) is the distance between the reference position RP and a translucent part 40 that is one of translucent parts 40 for the phase A use which is first disposed as the top. Xa(k), Xb(k), Xaa(k) and Xbb(k) are set at specific values that satisfy the following equations. With the settings, it is possible to place the translucent parts 40 on their associative light acceptance surfaces 25.

$$MOD(Xa(k),Pf)=(0/4)\times Pf+\phi,$$

$$MOD(Xb(k),Pf)=(1/4)\times Pf+\phi,$$

$$MOD(Xaa(k),Pf)=(2/4)\times Pf+\phi,$$

$$MOD(Xbb(k),Pf)=(3/4)\times Pf+\phi.$$

Here, the computation of MOD(A,B) is a calculation for obtaining a remainder of division of A by B. Additionally. $\phi$ is a value determinable depending upon the reference position RP. The $\phi$ value is in common to respective phases and is free from any phase difference. Pf is the wavelength of a light-and-shade pattern L1 as created upon irradiation of the light L from light source 3 onto the optical grating 11 as shown in FIG. 1. By determining the position of each index grating 33 in the way stated above, it is possible to allow PD 23 to receive and sense a light signal with its phase corresponding thereto.

As previously explained in FIG. 6, the light intensity differs in value in a way depending on a difference in position of the PD array. Due to this, when determining the position of translucent portion 40 by using the equations above, it will possibly happen in some cases that a total light receipt amount of PDs 23 for the phase A use, a total light receipt amount of PDs 23 for phase B use, a total light receipt amount of PDs 23 for phase AA use, and a total light receipt amount of PDs 23 for phase BB use fail to be the same as one another, resulting in lack of uniformity. If this is the case, it is possible, by varying the number and/or size of translucent portions 40, to equalize the total light receipt amounts of the PDs 23 used for each phase. An example is that in case the total light receipt amount of PDs 23 for the phase A use is less than the total light receipt amount of any other PDs 23, adequate adjustment is done for the number and/or width of the translucent parts 40 of index gratings to be laid out at the front faces of PDs 23 for the phase A use.

It must be noted that although in the first to fifth embodiments the measurement of a position change amount is done by use of four phase-different optical signals (i.e., light signals with the phases A, B, AA and BB), the photoelectric encoder of this invention should not be limited thereto. For example, three phase-different optical signals (i.e. a light signal with its phase of zero degrees, a light signal with its phase being offset by 120 degrees from 0 degrees, and a light signal with its phase offset by 240 degrees from 0 degrees) may alternatively be applicable to the photoelectric encoder of the invention.

Note that as shown in FIG. 1, the photoelectric encoders 1 in accordance with the first to fifth embodiments are of the so-called transmission type for performing the measurement of a displacement amount by use of the light L from LED 3 after having passed through the optical grating 11 of scale 5. However, this invention is also applicable to photoelectric encoders of the reflection type-that is, in the case where a displacement amount is measured by using the light L from LED 3, which was reflected at the optical grating 11 of scale 5.

The photoelectric encoder 1 in accordance with any one of the first to fifth embodiments is of the so-called two-grating structure type comprising the optical grating 11 provided at the scale 5 and the index gratings 33 disposed at the front faces of PDs 23. However, this invention is also applicable to an encoder of the three-grating type which further comprises, in addition to these gratings, an optical grating module laid out between the light source LED 3 and the scale 5.

As apparent from the foregoing, the photoelectric encoder in accordance with the invention, it is possible to enhance the averaging effect with respect to a change in light intensity occurring due to a light intensity distribution of the light source and also possible to prevent increase of a total value of junction capacitances of a plurality of light-receiving elements. Thus it is possible to achieve the intended encoder with high precision and high-speed responsibility.

What is claimed is:

1. A photoelectric encoder comprising:
   a light source;
   a scale including an optical grating for receiving irradiation of light from said light source; and
   a plurality of light-receiving elements for detection of a plurality of phase-different optical signals, said elements being relatively movably disposed in a measurement axis direction with respect to said scale and each having a light acceptance surface for incidence of an optical signal as generated based on the light falling onto said optical grating,
   wherein said plurality of light-receiving elements are arranged in an array,
   wherein light-receiving elements at an end portion of the array and at a central portion of the array detect said phase-different optical signals, and a light-receiving element placed at the end portion of the array is less in size than a light-receiving element at the central portion of said array.

2. The photoelectric encoder according to claim 1, wherein said plurality of light-receiving elements are laid out along the measurement axis, and wherein
   the light-receiving element placed at the end portion of said array is less than the light-receiving element at the central portion of said array in size of said light acceptance surface in said measurement axis direction.

3. The photoelectric encoder according to claim 2, further comprising:
   an optical receipt chip including said plurality of light-receiving elements, wherein
   said optical receipt chip further includes an index grating having a light shield portion partly covering said light acceptance surface.

4. The photoelectric encoder according to claim 3, wherein said optical receipt chip includes:
   a contact portion underlying said light shield portion with electrical conductivity and being connected to this light shield portion while being in contact with said light acceptance surface, and
   a wiring line connected to said light shield portion.

5. The photoelectric encoder according to claim 1, wherein said plurality of light-receiving elements are laid out along a direction substantially at right angles to the measurement axis, and wherein
   the light-receiving element placed at the end portion of said array is less than the light-receiving element at the central portion of said array in size of said light acceptance surface in the direction at right angles to said measurement axis.

6. The photoelectric encoder according to claim 1, wherein said plurality of light-receiving elements are in a plurality of sets being different in light-receiving element size on a per-set basis, and wherein light-receiving elements making up each set are continuously disposed at the same pitch and include light-receiving elements for detection of a plurality of phase-different optical signals.

7. The photoelectric encoder according to claim 6, wherein in each set, said light acceptance surface is made equal in size in said measurement axis direction, and wherein a set placed at the end portion of said array is less than a set at a central portion of said array in size of said light acceptance surface in said measurement axis direction.

8. The photoelectric encoder according to claim 6, wherein in a set of said plurality of sets being disposed at an intermediate portion of said array between the set placed at the end portion of said array and the set at the central portion of said array, the size of a light-receiving element is greater than that of the set at the end portion of said array and yet less than that of the set at the central portion of said array.

9. The photoelectric encoder according to claim 8, wherein in each set, the size of said light acceptance surface in said measurement axis direction is made equal, and wherein in the set placed at the intermediate portion of said array, the size of said light acceptance surface in said measurement axis direction is greater than that of the set at the end portion of said array and yet less than that of the set at the central portion of said array.

10. The photoelectric encoder according to claim 6, wherein sizes of said plurality of sets are determined respectively to ensure that a change amount of light intensity occurring due to a light intensity distribution on a plane of said array is kept constant on each set.

11. The photoelectric encoder according to claim 6, further comprising:

an optical receipt chip including said plurality of light-receiving elements, wherein said optical receipt chip further includes an index grating having a light shield portion partly covering said light acceptance surface.

12. The photoelectric encoder according to claim 11, wherein said optical receipt chip includes:

a contact portion underlying said light shield portion with electrical conductivity and being connected to this light shield portion while being in contact with said light acceptance surface, and a wiring line connected to said light shield portion.

13. A photoelectric encoder comprising:

a light source;

a scale including an optical grating for receiving irradiation of light from said light source;

an optical receipt chip relatively movable with respect to said scale in a measurement axis direction, for receiving irradiation of the light from said light source through said optical grating;

an array of a plurality of light-receiving elements disposed in the measurement axis direction and in a direction substantially perpendicular to the measurement axis direction on said optical receipt chip; and a plurality of index gratings placed at front faces of said plurality of light-receiving elements respectively, wherein said plurality of index gratings are mutually disposed along the measurement axis direction with a specified offset therebetween so that relative movement of said chip permits a plurality of phase-different optical signals to be output from said plurality of light-receiving elements, wherein light-receiving elements at an end portion of the array and at a central portion of the array detect said phase-different optical signals, and the light-receiving element placed at the end portion of said array is less in size than the light-receiving element placed at the central portion of said array in the direction perpendicular to the measurement axis direction.

14. The photoelectric encoder according to claim 13, wherein certain ones of said plurality of light-receiving elements for receiving optical signals with the same phase are disposed obliquely relative to said measurement axis whereas those of said light-receiving elements for receiving phase-different optical signals are periodically disposed in an oblique direction of said measurement axis.

* * * * *